United States Patent [19]

Funawatari et al.

[11] Patent Number: 5,454,251
[45] Date of Patent: Oct. 3, 1995

[54] METHOD OF MANUFACTURING A SHUTTER FOR A DISC CARTRIDGE

[75] Inventors: Takatsugu Funawatari, Miyagi; Daiki Kobayashi, Kanagawa; Takashi Taguchi, Niigata, all of Japan

[73] Assignee: Sony Corporation, Tokyo, Japan

[21] Appl. No.: 186,577

[22] Filed: Jan. 26, 1994

[30] Foreign Application Priority Data

Jan. 29, 1993 [JP] Japan .................... 5-013976

[51] Int. Cl.⁶ ............................... B21D 53/00
[52] U.S. Cl. .................. 72/337; 72/342.1; 72/379.2; 72/702
[58] Field of Search ................ 72/336, 337, 702, 72/456, 348, 379.2, 212, 342.1; 360/133, 133 A, 133 B, 133 C

[56] References Cited

U.S. PATENT DOCUMENTS

| | | | |
|---|---|---|---|
| 3,550,422 | 12/1970 | Potter | 72/342.1 |
| 5,007,264 | 4/1991 | Haack | 72/702 |
| 5,021,913 | 6/1991 | Overland | 72/336 |
| 5,036,421 | 7/1991 | Kaneda et al. | 360/133 |
| 5,099,675 | 3/1992 | Heath | 72/379.2 |
| 5,233,494 | 8/1993 | Kikuchi | 360/133 |
| 5,237,845 | 8/1993 | Kikuchi | 72/336 |

FOREIGN PATENT DOCUMENTS

| | | |
|---|---|---|
| 0343844 | 11/1989 | European Pat. Off. . |
| 0353000 | 1/1990 | European Pat. Off. . |
| 0390475 | 10/1990 | European Pat. Off. . |
| 0524824 | 1/1993 | European Pat. Off. . |
| 59-132470 | 7/1984 | Japan . |
| 170972 | 8/1986 | Japan ................ 360/133 A |
| 253581 | 10/1988 | Japan ................ 360/133 A |
| 94917 | 4/1991 | Japan ................ 72/342.1 |
| 99724 | 4/1991 | Japan ................ 72/702 |
| 1388141 | 4/1988 | U.S.S.R. .............. 72/379.2 |
| 2233810 | 1/1991 | United Kingdom . |

*Primary Examiner*—Daniel C. Crane
*Attorney, Agent, or Firm*—Ronald P. Kananen

[57] ABSTRACT

A manufacturing method of a shutter for a cartridge which is accommodating therein a recording medium includes the steps of punching out a plate-shaped metal material so as to provide a shutter of a developed shape having a pair of plate-shaped portions and a coupling portion for coupling the pair of plate-shaped portions, shaping the punched-out member in such a fashion that the pair of plate-shaped portions are opposed to each other across the coupling portion and that a spacing between free end sides of the pair of plate-shaped portions become narrower than a spacing of the pair of plate-shaped portions at its portion coupled by the coupling portion, and shaping the shaped member such that a spacing between free ends of the pair of plate-shaped portions of the member shaped by the second process become substantially equal to a spacing of the pair of plate-shaped portions at its portion coupled by the coupling member.

12 Claims, 5 Drawing Sheets

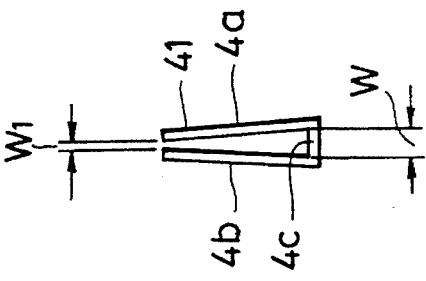
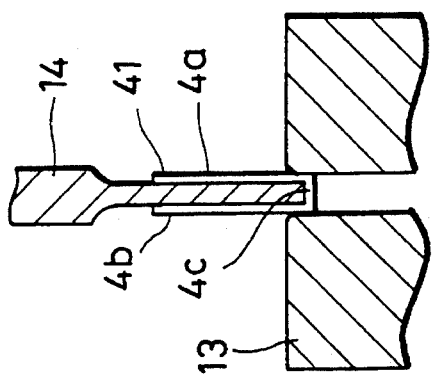
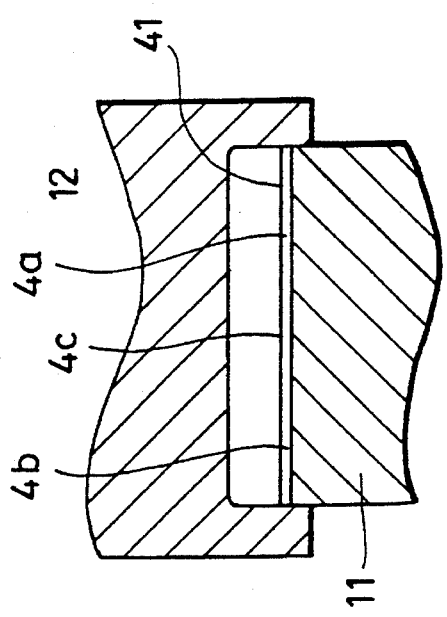
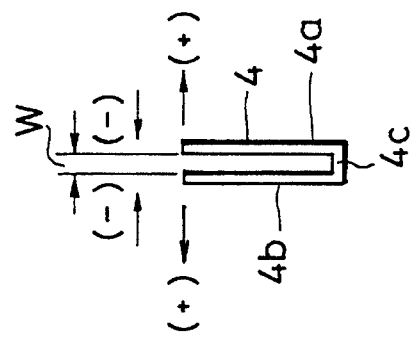
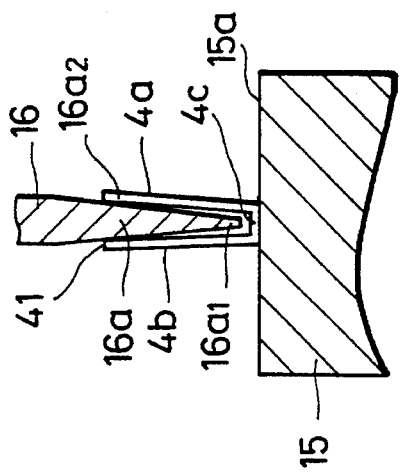
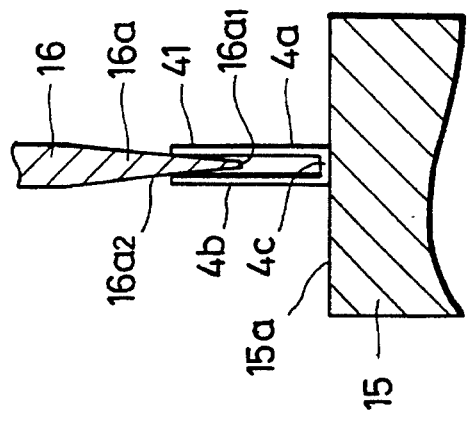

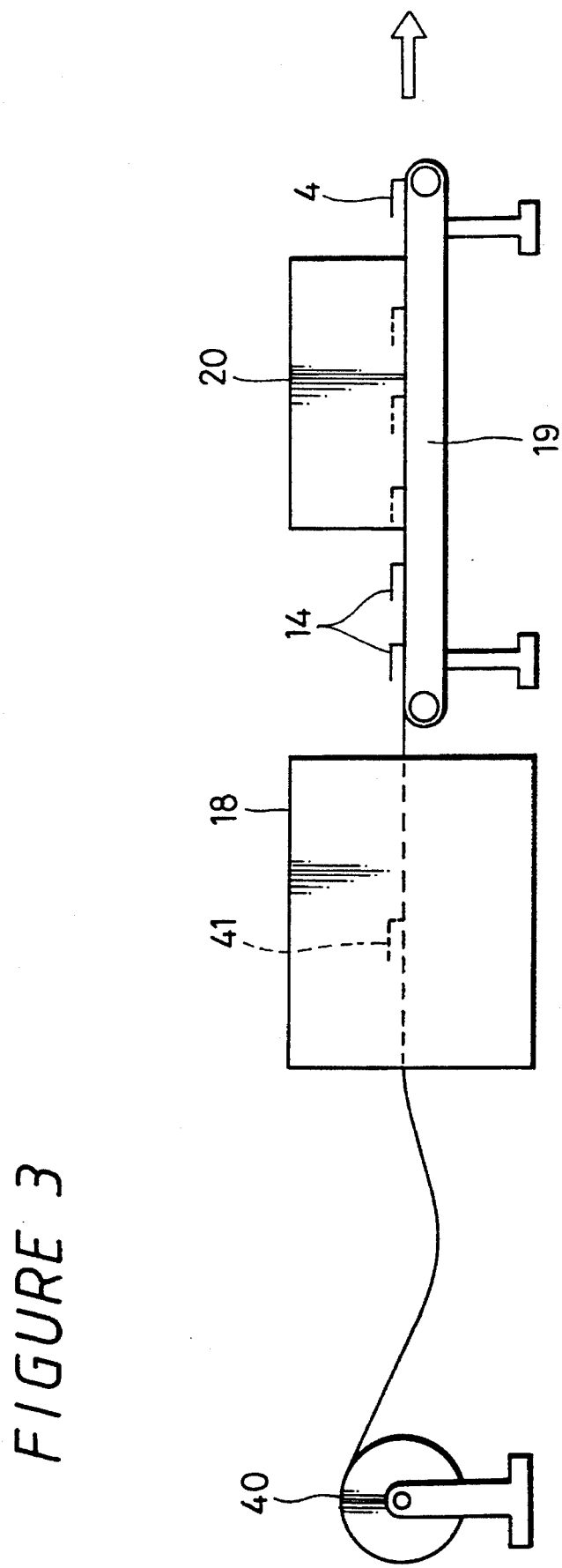

ized that data can be recorded on and/or reproduced from the recording medium by a head assembly. These openings are opened and closed by the shutter concurrently with the loading operation or eject operation of the disc cartridge on or from a recording and/or reproducing apparatus. The shutter is formed so as to have a substantially U-letter shaped cross-section using either a metal material or synthetic resin material. The shutter is attached to the cartridge body along its one side surface so as to straddle the cartridge body and to be freely slidable therealong. When the disc cartridge is not in use, the above openings are closed by the shutter so that the recording medium can be prevented from being smudged or damaged.

METHOD OF MANUFACTURING A SHUTTER FOR A DISC CARTRIDGE

BACKGROUND

1. Field of the Invention

The present invention relates to a method of manufacturing a shutter. More particularly, the present invention relates to a method of manufacturing a shutter for a disc cartridge in which a recording medium is accommodated.

2. Background of the Invention

It is customary that disk-shaped recording media, such as magnetic disks and optical discs, are accommodated in disc cartridges in order to prevent recording media from being smudged and damaged. Disc cartridges includes each a cartridge body in which a recording medium is accommodated and a shutter attached to the cartridge body. Openings are formed respectively through the front and rear surfaces of the cartridge body so that data can be recorded on and/or reproduced from the recording medium by a head assembly. These openings are opened and closed by the shutter concurrently with the loading operation or eject operation of the disc cartridge on or from a recording and/or reproducing apparatus. The shutter is formed so as to have a substantially U-letter shaped cross-section using either a metal material or synthetic resin material. The shutter is attached to the cartridge body along its one side surface so as to straddle the cartridge body and to be freely slidable therealong. When the disc cartridge is not in use, the above openings are closed by the shutter so that the recording medium can be prevented from being smudged or damaged.

Most of the shutters are, from a strength standpoint, generally made of metal, such as a stainless steel or the like. As a manufacturing method in this type of case, it has been proposed to punch out a plate-shaped metal material, and then shape the punched-out member to have substantially U-shaped cross-section using a single bending operation. The shutter thus obtained includes a pair of plate-shaped portions which open and/or close the openings of the above-mentioned cartridge body. EP-A-343844, for example, will be referred to in order to provide a better understanding of the above-mentioned shutter structure and manufacturing.

However, a drawback is encountered in that a residual stress tends to remain in the shutter which is formed using this single bending process and induce the problem that the spacing between the free ends of the pair of plate-shaped portions tends to increase with the passing of time or shock. Therefore, the spacing between the free ends of the shutter often increases with aging at normal or ambient temperatures. As a result, it is frequently observed that the two plate-shaped portions of the shutter flair out from the front and rear surfaces of a cartridge body. Even if a disc cartridge is dropped from a height of only about one meter, the spacing between the free ends of the two plate-shaped portions of the shutter tends to increase considerably. Accordingly, when a disc cartridge is ejected from a recording and/or reproducing apparatus, the shutter is sometimes caught by members disposed within the recording and/or reproducing apparatus so that the disc cartridge cannot be ejected or a similar type of trouble occurs.

SUMMARY OF THE INVENTION

It is an object of the present invention to provide a method of manufacturing a shutter in which the aforesaid shortcomings and disadvantages encountered with the related art can be eliminated.

According to the present invention, there is provided a manufacturing method of a shutter for a cartridge which accommodates a recording medium. This manufacturing method includes a first step of punching out a plate-shaped metal material so as to provide a shutter of a developed shape having a pair of plate-shaped portions and a coupling portion for coupling the pair of plate-shaped portions, a second step of shaping the member shaped by the first process such that the pair of plate-shaped portions are opposed to each other across the coupling portion and such that a spacing between free end sides of the pair of plate-shaped portions is smaller than the spacing between the pairs of plate-shaped portions at the coupling member, and a third step of re-shaping the member such that a spacing between free ends of the pair of plate-shaped portions of the member shaped by the first shaping process becomes substantially equal to a spacing of the pair of plate-shaped portions at the portions coupled by the coupling member.

Although the shutter manufactured in accordance with the present invention is shaped to have a substantially U-shaped cross-section, even when the shutter is subject to aging or shock when it is dropped, any change in the spacing between the pair of plate-shaped portions at the free end portions thereof can be suppressed. As a result, the shutter manufactured by the present invention can obviate the problem wherein the free ends of the shutter project or flair out from the surface of the disc cartridge body. Therefore, when the cartridge is loaded or ejected from a recording and/or reproducing apparatus, there is no risk that the loading operation or eject operation will be prevented or subject to any trouble.

BRIEF DESCRIPTION OF THE DRAWINGS

The invention will be more readily understood with reference to the accompanying drawings, in which:

FIGS. 2A through 2F are respectively schematic diagrams showing processes by which a shutter according to a first embodiment of the present invention, is manufactured, and wherein:

FIG. 2A is a diagram used to explain a punch-out process for punching out a metal plate in a development fashion;

FIGS. 2B and 2C are respectively diagrams used to explain a bending process which is used;

FIGS. 2D and 2E are diagrams used to explain a shaping process carried out following the bending process; and FIG. 2F is a diagram showing a cross-section of a shutter obtained as a final product.

FIG. 3 is a conceptual diagram showing a shutter manufacturing system to which the manufacturing method of the present invention is applied.

FIGS. 4A through 4D are respectively diagrams showing processes which characterize a method of manufacturing a shutter according to a second embodiment of the present invention, and in which:

FIG. 4A is a diagram used to explain a bending process;

FIGS. 4B and 4C are diagrams used to explain a shaping process executed after the bending process has been completed; and FIG. 4D is a diagram showing a cross section of a shutter obtained as a final product.

FIGS. 5A through 5D are respectively diagrams showing processes which characterize a method of manufacturing a shutter according to a third embodiment of the present invention, in which:

FIG. 5A is a diagram used to explain a bending process;

FIGS. 5B and 5C fare respectively diagrams which depict a shaping process executed after the bending process has been completed; and FIG. 5D is a diagram showing a cross-section of a shutter obtained as a final product.

DESCRIPTION OF THE INVENTION

A method of manufacturing a shutter according to the present invention will hereinafter be described with reference to the drawings.

In the embodiments which follow, the present invention will be described with reference to a shutter of a disc cartridge in which a magneto-optical disc is accommodated as a disk-shaped recording medium, by way of example.

Initially, an example of a disc cartridge to which a shutter manufactured according to the present invention is attached will be described hereinafter.

Figure 1A:
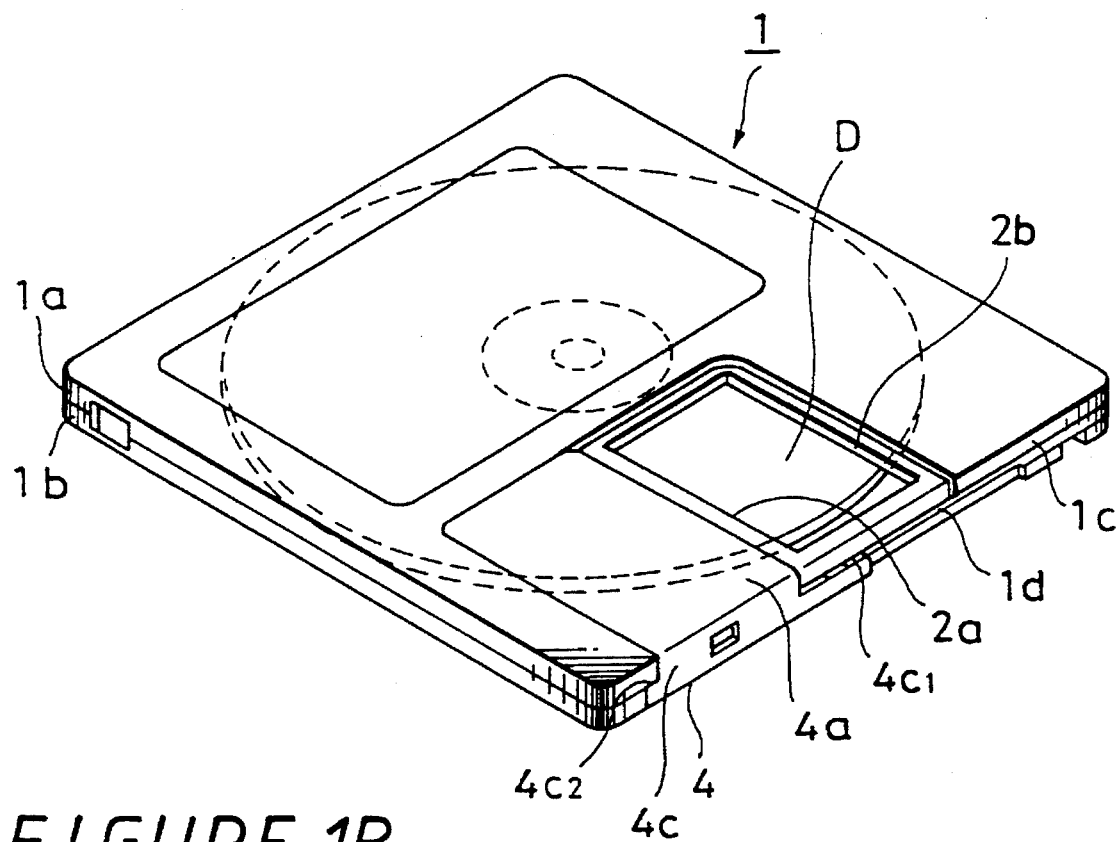
FIG. 1A is a perspective view of an upper side of a disc cartridge to which a shutter manufactured according to the present invention is attached.
Figure 1B:
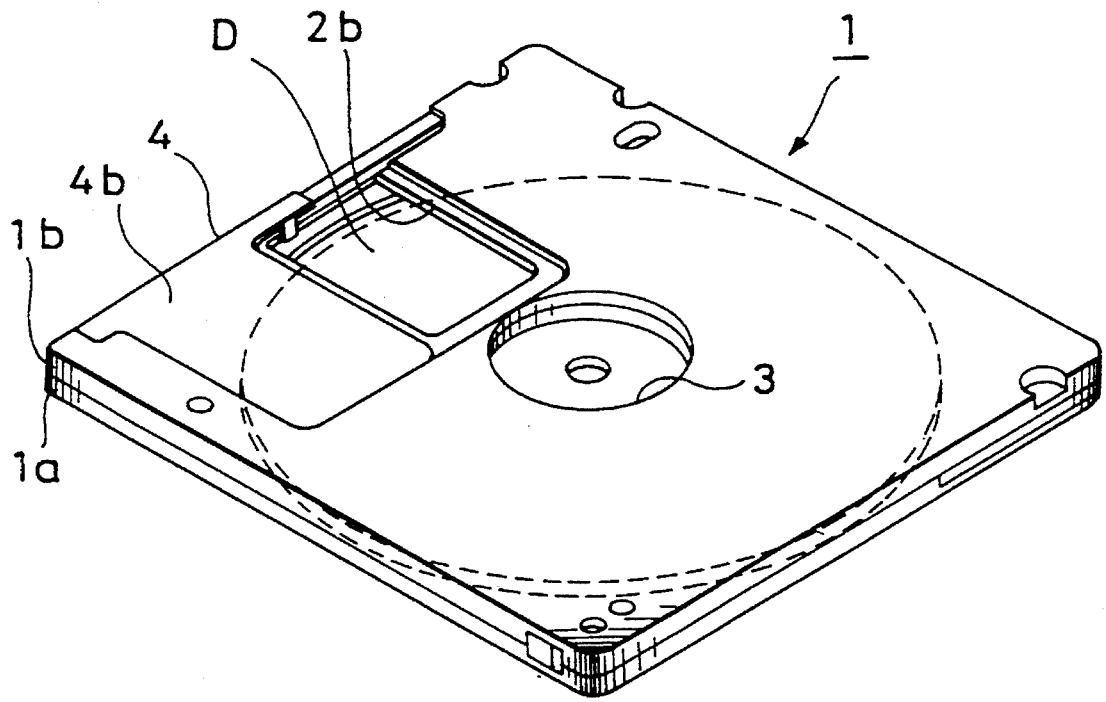
FIG. 1B is a perspective view of an underside of the same disc cartridge shown in FIG. 1A.

FIG. 1A shows a front surface side of a disc cartridge and FIG. 1B shows a rear surface side thereof.

As shown in FIGS. 1A and 1B, there is provided a cartridge body 1 in which a magneto-optical disc D is accommodated. The cartridge body 1 is formed by combining an upper half 1a and a lower half 1b. The two halves 1a and 1b have opposing openings 2a, 2b through which a radial portion of the magneto-optical disc D accommodated therein, is partly exposed. The lower half 1b has at its central portion a chucking central aperture 3 into which a disc rotation driving mechanism is inserted.

The cartridge body 1 includes a shutter member 4 attached thereto so as to be freely slidable to open and/or close the two openings 2a, 2b. The shutter 4 includes plate-shaped portions 4a, 4b corresponding to the openings 2a, 2b of the cartridge body 1 and a coupling portion 4c for coupling the plate-shaped portions 4a, 4b and whose width is substantially equal to a thickness of the cartridge body 1. The whole of the shutter 4 is substantially U-letter in cross-section.

The shutter 4 is attached to the cartridge body 1 from its front end face 1c at the side so as to straddle the cartridge body 1 where the openings 2a, 2b are formed. In this state, engagement protrusions $4c_1$, $4C_2$ formed on the coupling portion 4c of the shutter 4 are engaged with a guide groove 1d formed on the front end face 1c of the cartridge body 1 along its longitudinal direction. As a result, the shutter 4 opens or closes the openings 2a, 2b when it is slid back and forth.

A manufacturing process of the shutter 4 according to a first embodiment of the present invention will hereinafter be described with reference to FIGS. 2A through 2F.

Initially, as shown in FIG. 2A, in the first process, the shutter 4 is formed of a material 41 in a development shape. More specifically, a pair of plate-shaped portions 4a, 4b and the coupling portion 4c are punched out from a roll of plate-shaped metal material by a punch die 11 and a punch 12 so that the plate-shaped portions 4a, 4b and the coupling portion 4c are flush with and coupled to one another.

In the second process, as shown in FIG. 2B, the blank or piece of material 41 of the shutter member 4 has a development shape (hereinafter simply referred to as "material" 41) is bent by a bending die 13 and a bending punch 14 such that the two plate portions 4a, 4b thereof are opposed substantially in parallel to each other across the coupling portion 4c. By the second process, the material 41 is formed to have a substantially U-shaped cross-section.

In the third process, as shown in FIG. 2C, the two plate-shaped portions 4a, 4b of the material 41 which are formed into the substantially U-shaped cross-section, are bent such that a spacing between the free ends of the two plate-shaped portions 4a, 4b becomes narrower than the width of the coupling portion 4c. More specifically, as shown in FIG. 2C, the two plate-shaped portions 4a, 4b are bent inwardly so that an opening width dimension W1 between the free end sides of the material 41 is narrower than an opening width dimension W of the final shutter product. Viz., (W>W1).

In the fourth process, shown in FIGS. 2D and 2E, the material 41 is again shaped (viz., is re-shaped) so as to assume a substantially correct U-shaped cross-section by a setting die 15 and a setting punch 16.

The setting die 15 used in accordance with the fourth process has a flat supporting surface 15a. A tip end portion 16a of the setting punch 16 is formed with a tapered surface in such a fashion that a thickness dimension of a tip end $16a_1$ is smaller than the above-mentioned opening width dimension W1 between the two plate-shaped portions 4a, 4b of the material 41 and so that a thickness dimension of a base portion $16a_2$ thereof is larger than the above-mentioned opening width dimension W of the shutter 4 in its final form.

The coupling portion 4c of the material 41 whose free end spacing is reduced is set on the flat supporting surface 15a of the setting die 15. Under this condition, as shown in FIG. 2D, the tapered surface tip end portion 16a of the setting die 16 is inserted with a pressure into the space between a pair of plate-shaped portions 4a and 4b from the space between their free ends. Subsequently, as shown in FIG. 2E, the tapered surface tip end portion 16a is further inserted between the two plate-shaped portions 4a and 4b with a pressure, whereby the spacing between the free end portions of the two plate-shaped portions 4a and 4b, i.e., the opening portion thereof, is pushed outwardly by the base portion $16a_2$ of the tapered surface tip end portion 16a whose thickness dimension is larger than the opening width dimension W1. As a result, the two plate-shaped portions 4a, 4b are pushed outwardly relative to the coupling portion 4c and thereby re-bent slightly.

Thereafter, when the setting punch 16 is extracted from between the two plate-shaped portions 4a, 4b of the material 41, the plate-shaped portions 4a, 4b are such that, due to the flexibility of the material 41, the distance at the base end side serving as the coupling portion 4c and the spacing between the free ends, are equal to each other. More specifically, as shown in FIG. 2F, a final shutter product 4 is obtained in which the spacing between the two plate-shaped portions 4a and 4b is uniformly the aforementioned opening width dimension.

According to a series of bending processes that had been described thus far, a residual stress produced in the shutter 4 when a pair of plate-shaped portions 4a, 4b of the shutter 4 are bent is converted from the (+) side to the (−) side as shown in FIG. 2E and then alleviated. Further, since the spacing between a pair of plate-shaped portions 4a, 4b of the shutter 4 is selected to be the opening width dimension W of the final product, the above-mentioned spacing is stably maintained at this width dimension because of the low residual stress, i.e, such spacing is stably held at the spacing substantially equal to the thickness of the cartridge body 1.

If the above-mentioned bending processes are repeatedly carried out a plurality of times, then a residual stress in the two plate-shaped portions 4a, 4b can be decreased considerably.

The residual stress of the two plate-shaped portions 4a, 4b can be removed almost completely by heat-treating the shutter 4 thus formed at a temperature within or near the upper limit of an ambient temperature range, for example, of nearly 100(°C.). As a result, the spacing between the two plate-shaped portions 4a, 4b can be maintained more stably. A temperature in the heat treatment process is set to be a temperature slightly higher than 80(°C.) because the upper limit of a temperature which the magneto-optical disc D accommodated in a disc cartridge to which the shutter 4 is attached, is tolerable, is 80(°C.). In this case, however, the above-mentioned heat treatment temperature is not limited to substantially 100(°C.) and a temperature ranging from 0(°C.) to 100(°C.) may be properly selected with respect to the upper thermal limit of the magneto-optical disc D. In the heat treatment process, the shutter 4 is treated by heat in a furnace in which the shutter 4 is irradiated with infrared radiation.

FIG. 3 is a conceptual diagram showing a system in which a series of the above-mentioned processes can be carried out to manufacture the shutter 4.

As shown in FIG. 3, a sheet of material, i.e., a plate-shaped metal material 40, such as a stainless steel, aluminum plate or the like, which is wound on a bobbin 17, is transported to a press work machine 18. This press work machine 18 carries out the above-mentioned processes shown in FIGS. 2A to 2F. That is to say, in the first process or step, the material 41 is punched out, in the second step, the material 41 is bent into substantially U-shape, in the third step, the two plate-shaped portions 4a, 4b are bent so as to be angled inwardly, and in the fourth step or process, the two plate-shaped portions 4a, 4b are slightly re-bent by being pressed outwardly. In this manner, the aforesaid shutter 4 is shaped by this press work machine 18.

The shutter 4 thus shaped is transported on a belt conveyor 19 and then transported by the belt conveyor 19 to a heat treatment furnace 20, in which it is treated by heat at the aforesaid temperature to attenuate the residual stress and to provide the shutter 4 in its final form.

FIGS. 4A to 4D show a second embodiment for executing the bending work process of the shutter 4. One of the most specific features of the second embodiment of the present invention lies in the bending work process wherein the two plate-shaped portions 4a, 4b are bent inwardly. This bending work process according to the second embodiment corresponds to the third process in the bending work processes shown in FIGS. 2A to 2F.

Figure 4A:
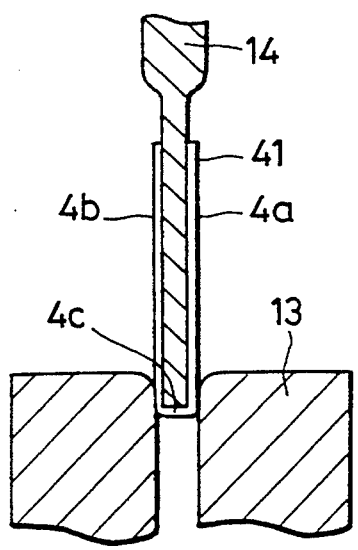

As shown in FIG. 4A, similarly to the second process shown in FIG. 2A, the material 41 of the shutter 4 in the developed state, is bent by the first bending die 13 and the first bending punch 14 in such a manner to cause a pair of plate-shaped portions 4a, 4b to oppose to each other across the coupling portion 4c in substantially parallel relationship to each other, and then shaped into the substantially U-shaped configuration.

Figure 4B:
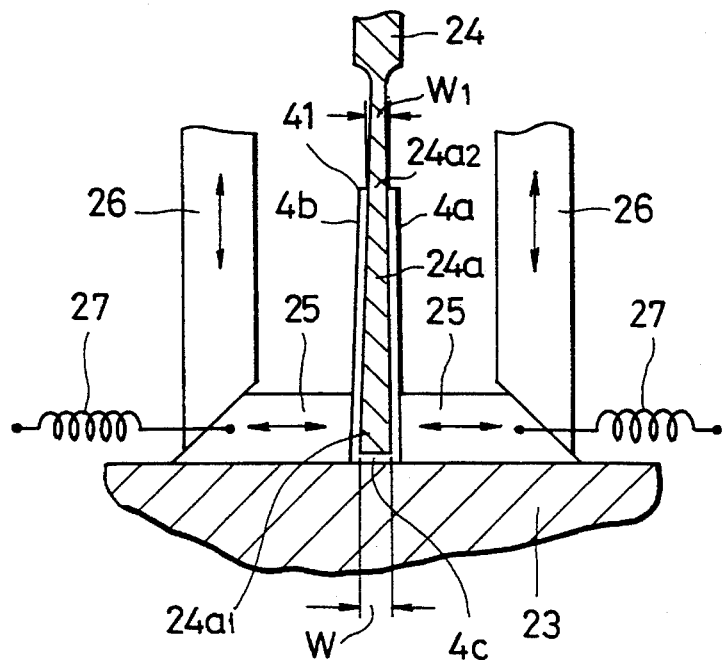

The material 41 which now has a substantially U-shaped cross-section is processed by a second bending die 23 and a second bending punch 24 as shown in FIG. 4B with the result that the pair of plate-shaped portions 4a, 4b are bent inwardly as shown in FIG. 4B.

More specifically, as shown in FIG. 4B, the second bending die 23 includes a slide die 25, a slide cam 26 for pressing the slide die 25 and a return spring 27 for the slide die 25. On the other hand, as shown in FIG. 4B, the second bending punch 24 is formed as an inverse tapered surface such that a thickness dimension of a tip end $24a_1$ of a tip end portion 24a is equal to the opening width dimension W of the final product mentioned above and such that a thickness dimension of a base portion $24a_2$ of the tip end portion 24a is equal to the dimension W1 which is smaller than the opening width dimension W. The slide die 25 is urged against the base end side of the material 41 under the condition that the bending punch 24 is inserted from the free end sides of the pair of plate-shaped portions 4a, 4b of the material 41. Under these conditions, when the slide cam 26 is moved downwardly, the slide die 25 is moved in the directions shown by arrows in FIG. 4B with the result that the material 41 is shaped. After the material 41 has been shaped, the slide die 25 is spaced apart from the material 41 by the return springs 27 and the slide cam 26 also is moved upwardly. By the second bending die 23 and the second bending punch 24 thus arranged, the two plate-shaped portions 4a, 4b of the material 41 are inwardly bent such that a relationship between the base end side width dimension W thereof and the free end side width dimension W1 thereof satisfies W>W1 similarly to the case shown in FIG. 2C. Therefore, the material 41 is shaped in a substantially U-shaped cross-section.

Figure 4C:
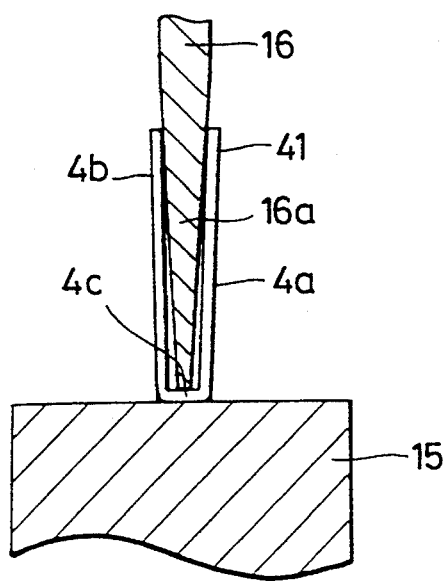
Figure 4D:
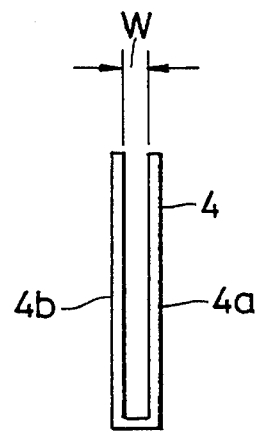

As shown in FIG. 4C, the material 41 is then subjected to the setting work in which the two plate-shaped portions 4a, 4b are pressed outwardly and then set in the bent state by the setting die 15 and the setting punch 16 similarly to the aforesaid fourth process shown in FIGS. 2D and 2E. As a result, a shutter 4 is obtained in which the whole spacing between the pair of plate-shaped portions 4a, 4b uniformly becomes the aforementioned opening width dimensions as shown in FIG. 4D.

According to the second embodiment of the present invention, the two plate-shaped portions 4a, 4b can be bent inwardly relative to the coupling portion 4c equally and reliably.

FIGS. 5A through 5D show a third embodiment of the fourth bending work process according to the present invention. In the third embodiment, one of the most specific features lies in the bending work process for bending the two plate-shaped portions 4a, 4b inwardly. This bending work process corresponds to the third process in the bending work processes shown in FIGS. 2A through 2E.

Figure 5A:
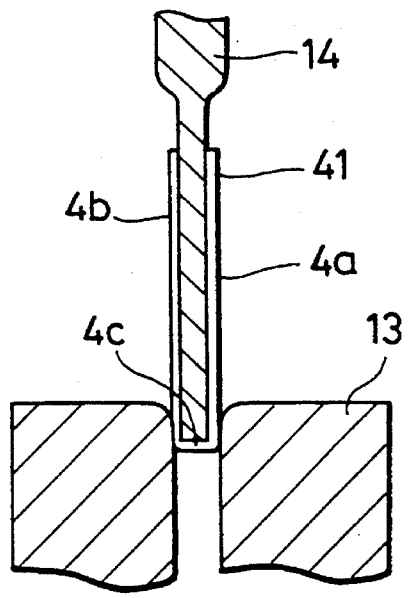

Also in the third embodiment of the present invention, through the use of the first bending die 13 and the first bending punch 14 shown in FIG. 5A, similarly to the second process mentioned above, the two plate-shaped portions 4a, 4b are bent across the coupling portion 4c so as to oppose to each other in a substantially parallel relationship to each other, and the material 41 is shaped to have a substantially U-shaped cross-section.

Figure 5B:
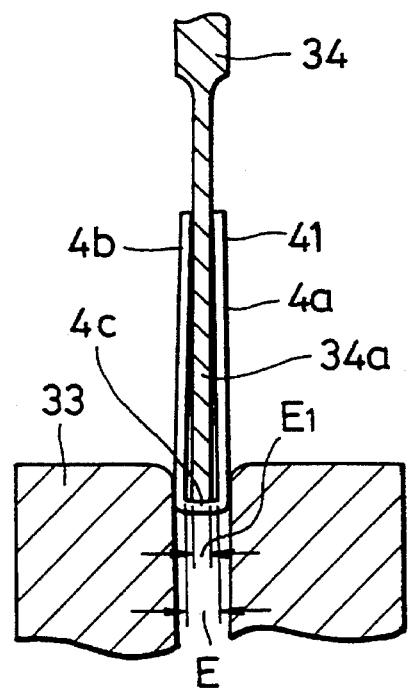

The two plate-shaped portions 4a, 4b of the material 41 are bent inwardly by a second bending die 33 and a second bending punch 34 as shown in FIG. 5B. In the second bending punch 34 used in this second bending process, a thickness dimension E1 of a tip end portion 34a thereof is set smaller than an inner width dimension E of the material 41 (E>E1) as shown in FIG. 4B. When the material 41 is bent by the second bending punch 34 and the second bending die 33, the two plate-shaped portions 4a, 4b are bent inwardly in a range of a difference between the dimension E and the dimension El, so that the material 41 is re-shaped.

Figure 5C:
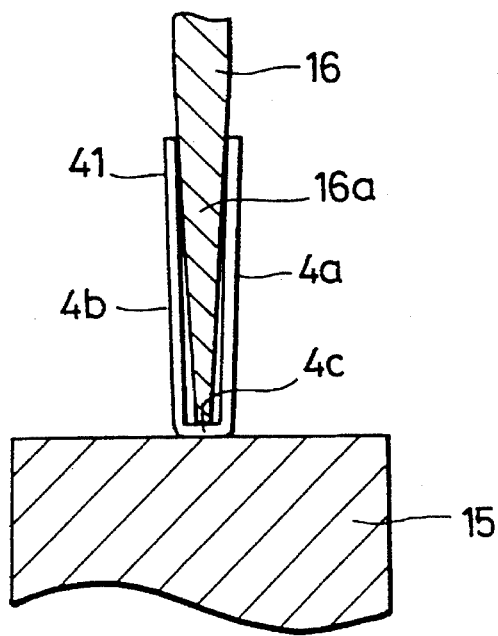
Figure 5D:
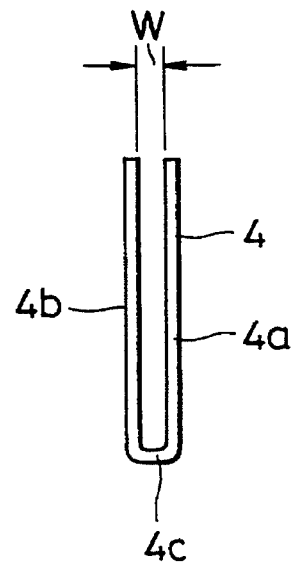

Following this, the material 41 is treated by the setting work process using the setting die 15 and the setting punch 15 similarly to the aforesaid first and second embodiments, as shown in FIG. 5C. As a consequence, a shutter 4 is obtained in which the spacing between the two plate-shaped portions 4a and 4b is uniformly the aforesaid opening width dimension W as shown in FIG. 5D.

According to the third embodiment of the present invention, a mold structure used in the bending work process in which the two plate-shaped portions 4a, 4b are bend inwardly can be simplified.

According to the aforesaid second and third embodiments of the present invention, the residual stress can be removed almostly completely by heat treating the shutter 4 in a manner similar to that used in the first embodiment, and thus render the spacing between the two plate-shaped portions 4a and 4b more stable.

While the present invention has been described as applied to the manufacturing process for a shutter of a disc cartridge in which the magneto-optical disc is accommodated, the present invention is not limited thereto and may also be applied to shutters of substantially U-shaped cross-section that are attached to floppy disks or the like.

Furthermore, the shape or the like of the shutter is not limited to the above-mentioned one and may be varied.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A manufacturing method of a shutter for a recording medium enclosing cartridge, comprising the steps of:

punching out a plate-shaped metal material so as to provide a shutter in a developed shape having a pair of plate-shaped portions and a coupling portion for coupling said pair of plate-shaped portions;

shaping the punched out member using a first bending punch and a first bending die such that said pair of plate-shaped portions are opposed to each other across said coupling portion and taper inwardly toward each other such that a spacing between free ends of said pair of plate-shaped portions is smaller than a spacing of said pair of plate-shaped portions at its portion coupled by said coupling portion; and reducing residual stress caused by said shaping step by re-shaping said member using a second bending punch and a second bending die such that a spacing between free ends of said pair of plate-shaped portions permanently becomes substantially equal to a spacing of said pair of plate-shaped portions at its portion coupled by said coupling member.

2. A manufacturing method according to claim 1, wherein said re-shaping is a process in which the spacing between the free ends of said pair of plate-shaped portions of said member shaped by said shaping process is temporarily widened by said second bending punch and said second bending die more than the spacing of the portions coupled by said coupling portion.

3. A manufacturing method according to claim 2, wherein said second bending punch has a tapered shape such that its thickness is reduced in its tip end portion and its portion corresponding to said free ends of said pair of plate-shaped portions is larger than the spacing of the portions of said plate-shaped portions coupled by said coupling member and wherein said second bending punch is inserted between said free ends of said pair of plate-shaped portions and moved toward said coupling portion.

4. A manufacturing method according to claim 1, wherein said shaping comprises a process using said first bending punch and said first bending die for shaping said member obtained by said punching into a substantially U-shaped cross-sectional configuration such that said pair of plate-shaped portions are opposed to each other across said coupling portion, and such that a spacing between the free ends of said pair of plate-shaped portions is smaller than a spacing between said pair of plate-shaped portions at its portions coupled by said coupling portion.

5. A manufacturing method according to claim 4, wherein said first bending punch has a portion corresponding to said free ends of said member which is at least narrower than a spacing between said pair of plate-shaped portions at the portions coupled by said coupling portion, and wherein said first bending punch is inserted through said free ends of said pair of plate-shaped portions toward said coupling portion.

6. A manufacturing method according to claim 4, wherein said first bending punch has a portion corresponding to said free ends of said U-shaped cross-sectional member which is at least narrower than a spacing between said pair of plate-shaped portions at the portions coupled by said coupling portion, said first bending punch being inserted from said free ends of said pair of plate-shaped portions so that the portions coupled by said coupling portions of said pair of plate-shaped portions are shaped so as to reduce the spacing between said free ends.

7. A manufacturing method according to claim 4, wherein said said first bending punch has a width substantially equal to that of said coupling portion and said first bending die has a shape which complements the shape of said first bending punch.

8. A manufacturing method according to claim 1, said method further comprises heat treating said member obtained by said re-shaping at a temperature at which a residual stress caused by the bending of said U-shaped cross-sectional member, can be attenuated.

9. A manufacturing method according to claim 1, said method further comprises heat treating said member obtained using said re-shaping at a temperature near an upper limit of an ambient temperature range within which said member is used as a shutter.

10. A method of manufacturing a shutter for a disc cartridge comprising the steps of:

punching out a blank from a sheet of metal material;

bending the blank along two bend lines to form a U-shaped slider having a pair of plate shaped side portions which are interconnected at their upper ends by a coupling edge portion, said bending step including the use of a first bending punch and a first bending die which overbend said side portions with respect to said edge portion so as to cause side portions to be angled in toward each other so that the clearance between said side portions at the upper ends is greater than the clearance between lower free ends of said side portions; and rebending the slider using a second bending punch and a second bending die so that said side portions assume a condition wherein they permanently extend essentially parallel to one another and the clearance therebetween is essentially uniform, said rebending step reducing a residual stress which tends to cause said side wall portions to flair out and become non-parallel with at least one of the passing of time and application of shock.

11. A method of manufacturing a shutter for a disc cartridge as set forth in claim 10, further comprising repeating the bending and rebending steps to increase the attenuation of the residual stress in said shutter.

12. A method of manufacturing a shutter for a disc cartridge as set forth in claim 10, further comprising the step of heat treating the shutter after said step of re-bending to reduce the amount of residual stress in said shutter.

\* \* \* \* \*